Jan. 5, 1943.  L. D. ADAM  2,307,478

FISH LURE

Filed July 26, 1941

INVENTOR.
Louis D. Adam
BY Frank M. Slough
HIS ATTORNEY

Patented Jan. 5, 1943

2,307,478

UNITED STATES PATENT OFFICE 2,307,478

FISH LURE

Louis D. Adam, Ponca City, Okla., assignor to The American Fork & Hoe Company, Cleveland, Ohio, a corporation of Ohio Application July 26, 1941, Serial No. 404,217

3 Claims. (Cl. 43—42)

My invention relates to artificial lures and relates more particularly to such improved form of lure as will simulate the movement of a live body through the water.

An object of my invention is to provide an artificial lure which will be attractive in operation and which will be durable in use and inexpensive to manufacture.

Other objects of my invention and the invention itself will become increasingly apparent from the following description and drawing wherein.

Figure 1:
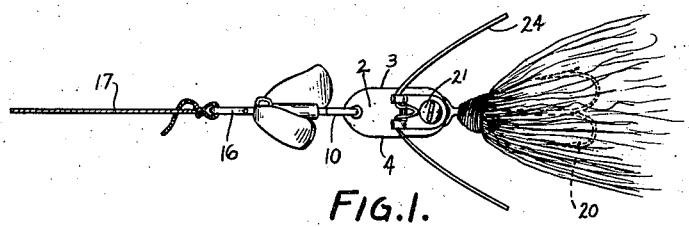
Fig. 1 is a top plan view of the improved lure of my invention.
Figure 2:
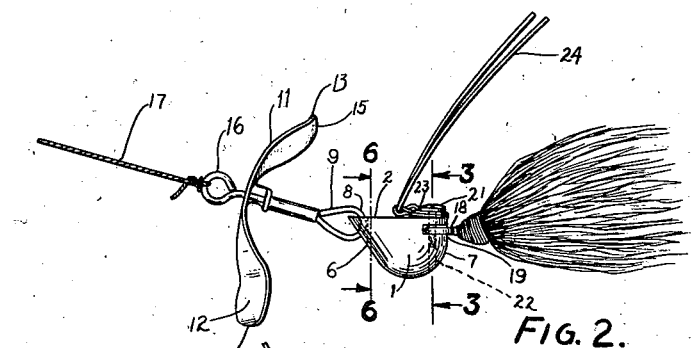
Fig. 2 is a side elevational view partly in section of the improved lure of my invention.
Figure 3:
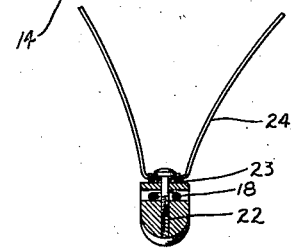
Fig. 3 is a sectional view taken on the line 3—3 of Fig. 2.
Figure 6:
Fig. 6 is a front plan view of the lure body of my invention.
Figure 4:
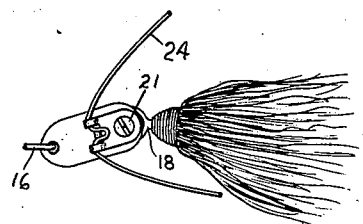
Fig. 4 is a view of my improved lure in action showing it in one of its numerous operative positions.
Figure 5:
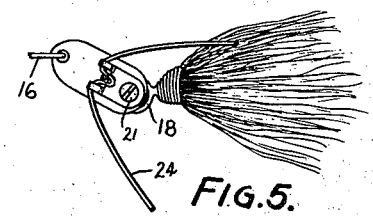
Fig. 5 is a view similar to that of Fig. 4 showing the lure in a different operative position from that illustrated in Fig. 4.

Referring now to the drawing in all of which like parts are designated by like reference characters, and referring more particularly to Fig. 2, at 1 I show a solid lure body, substantially pear shaped in cross section, having a flat preferably rectangular upper surface 2, the leading edge thereof being of less width than the tail or rear edge thereof; flat substantially parallel sides 3 and 4, a rounded under body 5 and rounded breast portion 6 and tail portion 7.

The forward leading edge of said lure body is provided with a perforation 8 through which the eye of the shank 10, upon which the unbalanced spinner 11 is mounted, is projected. The said spinner 11 is rotatably mounted upon the bearing or shank 10 and has a pair of spinner arms, one being a substantially wide and relatively long spinner arm 12 and the other arm 13 being relatively shorter and substantially narrower, the two arms being integrally united and having outwardly extending flared ears 14 and 15 respectively. The shank 10 is provided forwardly of its spinner mounting with an eye 16 to which a lead line 17 is secured.

The improved lure of my invention is further provided with a substantially wide slot 18, spaced from the upper edge of the tail portion of the upper surface of the lure, into which an eye 19 of the shank of the hook 20 is adapted to be projected, said hook being secured therein by screw means 21 adapted to be projected through an aperture 22 disposed vertically of the rearmost portion of the lure body, said aperture being provided at right angles to the slot 18 and adapted to traverse the same.

The screw 21 is projected first through the upper portion of the aperture 22 in the upper face portion of the lure, thence through the slot 18 into the eye 19 of the hook placed therein and continues downward through the lowermost portion of the tail portion of the lure body as guided by said aperture 22.

In the event that a weed guard is used with the improved lure of my invention, as shown in the drawing herein, the said screw means 21 may be used to secure the same to the lure body and in the embodiment shown to accomplish this must first traverse an aperture in the plate 23, which plate is provided as a mounting for said weed guard 24. The said weed guard constitutes no essential element of the present invention and is more fully described in my co-pending application for Letters Patent, Serial No. 397,442, filed June 10, 1941.

The eye 19 of the hook 20 of my invention is preferably of lesser width than the width of the slot 18 and its inner periphery is preferably of greater extent than the outer periphery of the screw threaded portion of the screw means projected therethrough whereby said hook is loosely mounted within said slot and adapted to be freely movable from side to side in the slot 18 although prevented from displacement in an upward direction by the lure body. The hook, being freely movable in a lateral direction, may travel from side to side however as the lure moves through the water.

Since the unbalanced spinner used with my improved lure imparts an uneven action to the lure which is translated into a side to side movement of the lure and the side to side movement of the hook is independent thereof to a certain extent, the lure is given a life-like movement through the water and is hence attractive to fish.

In view of the fact that the guard of the hook lies uppermost as the lure is drawn through the water and the lure maintains an even keel and will not turn over and the hook is prevented against displacement in an upward or downward direction, the hook, whether provided with feathering as in the form illustrated herein or not, will be unlikely to catch weeds. Furthermore, by providing the lure with a weed guard, as referred to hereinbefore as being claimed more particularly in one of my co-pending applications, the lure is practically incapable of becoming entangled with weeds.

Although I have described my invention in connection with a particular embodiment thereof, I am aware that numerous and extensive changes and departures may be made therefrom without however departing from the spirit of my invention and the scope of the appended claims.

I claim:

1. A fish lure including a generally pear-shaped body portion, said lure body being generally solid, having substantially straight side portions, a straight upper face portion having rounded breast and tail portions and a rounded underbody, said lure body being provided with a perforation adjacent its leading edge, and a perforation adjacent its rearmost portion, said forward perforation forming a point of attachment for the line attachment means and for an intermediate shank having unbalanced spinner means pivotally mounted thereon, a slot in the rearmost portion of said lure body and disposed at right angles to said perforation whereby an eye of a hook may be disposed therein, and securing means adapted to be disposed through said slot and said eye whereby said hook may be secured to said lure body.

2. In a fish lure, a substantially pear-shaped lure body having a substantially flat upper face, substantially flat side portions and a rounded tail, breast and underbody portion, a slot disposed in the rounded tail portion, said slot extending through said substantially flat side portion, a perforation disposed transversely of said slot through which securing means may be projected to secure a hook having a forward eye portion projected within said slot to the said lure body, said eye being of relatively lesser width than said slot and of relatively greater inner circumference than said securing means whereby said hook is permitted lateral movement within said slot.

3. A fish lure including a generally pear-shaped body portion, said lure body having generally flat side surfaces and a curved undersurface, said lure body having line attachment means pivotally secured to the forward edge of said body, and hook means loosely mounted adjacent its rear upper edge portion, said hook means adapted to have side-to-side movement with respect to said lure body, said lure body being constructed to prevent any upward movement of said hook.

LOUIS D. ADAM.